US008193308B2

(12) United States Patent
Irie et al.

(10) Patent No.: US 8,193,308 B2
(45) Date of Patent: Jun. 5, 2012

(54) PROCESS FOR PREPARING FLUORINE-CONTAINING POLYMER AND FLUORINE-CONTAINING POLYMER PREPARED BY SAID PREPARATION PROCESS

(75) Inventors: Masaki Irie, Settsu (JP); Yosuke Nishimura, Settsu (JP); Manabu Fujisawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 239 days.

(21) Appl. No.: 11/913,287

(22) PCT Filed: Apr. 28, 2006

(86) PCT No.: PCT/JP2006/308979
§ 371 (c)(1),
(2), (4) Date: Oct. 31, 2007

(87) PCT Pub. No.: WO2006/118247
PCT Pub. Date: Nov. 9, 2006

(65) Prior Publication Data
US 2009/0082519 A1    Mar. 26, 2009

(30) Foreign Application Priority Data

May 2, 2005    (JP) .................................. 2005-134194

(51) Int. Cl.
*C08F 6/00*    (2006.01)
(52) U.S. Cl. .................... 528/502 R; 528/499; 528/503; 524/544
(58) Field of Classification Search .................. 524/544; 528/499, 502 R, 503
See application file for complete search history.

(56) References Cited

U.S. PATENT DOCUMENTS

| 3,536,683 | A | * | 10/1970 | Cooper et al. ................. 528/485 |
| 3,644,319 | A | * | 2/1972 | Seki et al. ...................... 528/499 |
| 3,900,654 | A | * | 8/1975 | Stinger .......................... 428/214 |
| 4,035,565 | A |   | 7/1977 | Apotheker et al. |
| 4,132,845 | A | * | 1/1979 | Covington et al. ............ 528/499 |
| 4,339,553 | A | * | 7/1982 | Yoshimura et al. ............ 524/544 |
| 4,408,038 | A |   | 10/1983 | Covington, Jr. et al. |
| 5,391,709 | A |   | 2/1995 | Egres, Jr. et al. |
| 5,869,577 | A | * | 2/1999 | Aihara et al. .................. 525/276 |
| 6,140,437 | A | * | 10/2000 | Kitaichi et al. ................ 526/247 |
| 6,268,469 | B1 |  | 7/2001 | Hiraga et al. |
| 6,703,461 | B1 | * | 3/2004 | Tanaka et al. .................. 526/242 |
| 7,375,171 | B2 | * | 5/2008 | Nishimura et al. ............ 526/250 |
| 2002/0037985 | A1 |  | 3/2002 | Lyons et al. |
| 2004/0024134 | A1 | * | 2/2004 | Grootaert et al. .......... 525/326.2 |

FOREIGN PATENT DOCUMENTS

| CN | 1293681 A | 5/2001 |
| EP | 1 645 572 A1 | 4/2006 |
| JP | 49-1948 | 1/1974 |
| JP | 491948 B1 | 1/1974 |
| JP | 53-147787 A | 12/1978 |
| JP | 58-176219 A | 10/1983 |
| JP | 62285906 A | 12/1987 |
| JP | 2001-508474 A | 6/2001 |
| JP | 2004509993 A | 4/2004 |
| NL | 6900191 | 7/1970 |
| WO | WO0224770 A1 * | 3/2002 |

OTHER PUBLICATIONS

Lewis, Sr. R. Hawley's Condensed Chemical Dictionary, 2007, p. 1197.*

* cited by examiner

*Primary Examiner* — Mark Eashoo
*Assistant Examiner* — Nicole M Buie-Hatcher
(74) *Attorney, Agent, or Firm* — Sughrue Mion, PLLC

(57) ABSTRACT

The present invention provides the process for preparing a fluorine-containing polymer which can easily and efficiently separate a fluorine-containing polymer and water from an aqueous dispersion of a fluorine-containing polymer, and the fluorine-containing polymer obtained by the mentioned preparation process. Further the present invention provides the molded article obtained by crosslinking a curable composition comprising the above-mentioned fluorine-containing polymer and a crosslinking agent. The preparation process is a process for preparing a fluorine-containing polymer comprising a step for heat-treating an aqueous dispersion of a fluorine-containing polymer having a concentration of 3 to 70% by weight to obtain the fluorine-containing polymer having a water content of not more than 1% by weight.

6 Claims, No Drawings

PROCESS FOR PREPARING FLUORINE-CONTAINING POLYMER AND FLUORINE-CONTAINING POLYMER PREPARED BY SAID PREPARATION PROCESS

CROSS REFERENCE TO RELATED APPLICATIONS

This application is a National Stage of International Application No. PCT/JP2006/308979 filed on Apr. 28, 2006, claiming priority based on Japanese Patent Application No. 2005-134194, filed May 2, 2005, the contents of all of which are incorporated herein by reference in their entirety.

TECHNICAL FIELD

The present invention relates to a process for preparing a fluorine-containing polymer, and a fluorine-containing polymer obtained by the preparation process. Also the present invention relates to a molded article obtained by crosslinking a curable composition comprising the above-mentioned fluorine-containing polymer and a crosslinking agent.

BACKGROUND ART

Fluorine-containing polymers are widely employed in the fields of automobile industries, semiconductor industries and chemical industries, since those polymers exhibit excellent chemical resistance, solvent resistance and heat resistance. Particularly fluorine-containing polymers comprising vinylidene fluoride (VdF) and/or tetrafluoroethylene (TFE) unit and a copolymerizable monomer unit such as hexafluoropropylene (HFP) or perfluoro(alkyl vinyl ether) (PAVE) exhibit characteristics of elastomer depending on a composition thereof, and therefore are used as an O-ring, gasket, hose, stem seal, shaft seal, diaphragm, electric wire, shock-absorbing material and the like which are used under severe environment. However fluorine-containing elastomers are generally expensive as compared with other kinds of rubbers, and therefore shortening of a cycle time at mold-processing and improvement in yield are strongly demanded. Accordingly, for the purpose of taking the pace of a method of compression molding requiring a long cycle time and a method of transfer molding giving a poor yield, there have been developed a method of injection molding enabling high cycle production and a method of integrated molding with other material which makes it possible to reduce length of a molding step. However many of polymers suitable for these molding methods of low cost are those having a relatively low viscosity, and thus conventional fluorine-containing elastomers cannot sufficiently meet the requirements of such methods.

On the other hand, such fluorine-containing elastomers are prepared by various polymerization methods such as a suspension polymerization method and an emulsion polymerization method. Of these fluorine-containing elastomers, those obtained by an emulsion polymerization method are in such a state that primary particles having an average particle size of several tens to hundreds of nanometers are emulsified and dispersed in water. Since it is difficult to directly filtrate the fine primary particles in this emulsified dispersion, usually there is employed a method of agglomerating the primary particles by adding a coagulant such as a metallic salt or an acid to obtain agglomerated (secondary) particles having an average particle size of several μm to thousands of μm and then filtrating the obtained particles to prepare fluorine-containing elastomers. Though this method can be used suitably for preparing fluorine-containing elastomers having a medium viscosity and a high viscosity, but in the case of preparing fluorine-containing elastomers having a low viscosity, there is a problem that the coagulated polymer sticks to a stirrer blade and a filter of equipment used in a separation step, resulting in blocking of equipment, and it is difficult to efficiently separate the polymer. In order to solve this problem, a method of treating in a state of low viscosity by freeze-coagulation is known, but there is a problem that a running cost is very high. Also it is usually difficult to completely remove water only by the above-mentioned filtration, and drying by heating is necessary after solid-liquid separation. For example, a green rubber is obtained by a method such as hot air drying with a chamber oven or melt-extrusion drying with an extruder. Even in such a process, in the case of a low viscosity rubber, there is a problem, in many cases, that contamination of equipment and equipment failure occur due to foaming and adhesion of a product. As mentioned above, because of not only a problem that dehydration and drying steps themselves are usually complicated but also the above-mentioned problems occurring in the case of usual treating method of a low viscosity rubber, it has been difficult to bring products to market.

Also it is known that reduction of metals contained in a fluorine-containing polymer is particularly preferable in the field of semiconductor producing equipment where cleanness is required, and for that purpose, it is effective not to use metals in all the preparation processes such as polymerization and coagulation. For example, for the purpose of avoiding mixing of a metal derived from a coagulant such as aluminum sulfate which is usually used in a coagulation step, a method of coagulation with an acid or by a freezing process is disclosed (for example, refer to WO 99/50139). However in the case of using an acid, since an acid is a dangerous chemical, it is not preferable from the viewpoint of working environment. Also equipment having corrosion resistance costs high, and further it is necessary to use devices subjected to special treatment such as lining with a resin in order to prevent elution of a metal from the equipment. In addition, in the case of a freezing process, there is a problem with a high running cost resulting from refrigerating. Also in the both cases, there is a problem that a special attention must be given to prevent mixing of a metal during transferring to a drying step.

For separating a fluorine-containing elastomer from an emulsion of fluorine-containing elastomer, a method of separating a polymer from a polymer being heavier than water and containing water in an amount of up to about 90% by using a specific separator is disclosed (for example, cf. JP53-147787A).

In addition, a method of coagulating and agglomerating fluoroelastomer particles in a slurry flow to be treated of fluoroelastomer and then supplying the obtained treated flow containing agglomerated fluoroelastomer to a mechanical dehydrating equipment is disclosed (for example, cf. JP58-176219A). However in this method, since a coagulant is used like a conventional method, complicated steps are required and an obtained fluoro rubber contains a metal. Therefore it is not preferable to use this method in the field of semiconductor where cleanness is required. Further it is known by persons skilled in the art that in treating a rubber having a low viscosity, to prevent blockage of equipment due to adhesion of a product, various treating conditions and means are required for the equipment.

Further there is disclosed a process for preparing a fluoro rubber by radical polymerization of vinylidene fluoride and an optional fluorine-containing monomer and/or non-fluorine-containing monomer under specific conditions in the absence of water, which is characterized in that the fluoro rubber is fed to an outlet at the base of a reactor and pushed out at a temperature at least corresponding to a reaction temperature (for example, cf. JP2001-508474A). However in JP2001-508474A, polymerization is carried out in the presence of a non-aqueous solvent, and there is no description with respect to an aqueous dispersion of a polymer.

Accordingly, at present there is no method of being capable of efficiently separating a fluorine-containing polymer and an aqueous solvent from an aqueous dispersion of a fluorine-containing polymer and obtaining a fluorine-containing polymer containing no metal.

DISCLOSURE OF INVENTION

The present invention provides a process for preparing a fluorine-containing elastomer which can easily efficiently separate a fluorine-containing polymer and water from an aqueous dispersion of a fluorine-containing polymer, and provides a fluorine-containing polymer obtained by the preparation process. Further the present invention provides a molded article obtained by crosslinking a curable composition comprising the fluorine-containing polymer and a crosslinking agent.

Namely, the present invention relates to a process for preparing a fluorine-containing polymer which comprises a step for heat-treating an aqueous dispersion of a fluorine-containing polymer having a concentration of 3 to 70% by weight to obtain a fluorine-containing polymer having a water content of not more than 1% by weight.

The concentration of the aqueous dispersion of a fluorine-containing polymer is preferably 10 to 50% by weight.

A Mooney viscosity ($ML_{1+10}$ at 100° C.) of the fluorine-containing polymer is preferably not more than 40.

The present invention also relates to a fluorine-containing polymer having a water content of not more than 1% by weight which is obtained by the above-mentioned preparation process.

Further the present invention relates to a curable composition comprising the above-mentioned fluorine-containing polymer and a crosslinking agent, and a molded article obtained by crosslinking the composition.

It is preferable that the above-mentioned curable composition further comprises a filler.

BEST MODE FOR CARRYING OUT THE INVENTION

The present invention relates to the process for preparing a fluorine-containing polymer, comprising a step for heat-treating an aqueous dispersion of a fluorine-containing polymer having a concentration of 3 to 70% by weight to obtain a fluorine-containing polymer having a water content of not more than 1% by weight.

The concentration of the aqueous dispersion of a fluorine-containing polymer used in the present invention is 3 to 70% by weight, preferably 10 to 50% by weight, more preferably 15 to 35% by weight. When the concentration is less than 3% by weight, there is a tendency that a running cost becomes high because heat energy necessary for drying is increased, and when the concentration is more than 70% by weight, storage stability of the aqueous dispersion tends to deteriorate, but it is possible to stabilize the storage stability by adding an emulsifying agent. However adding an unnecessary emulsifying agent is not preferable from the viewpoint of quality and cost. The concentration of the aqueous dispersion of a fluorine-containing polymer represents a polymer concentration.

The fluorine-containing polymer is not limited particularly, and examples thereof are fluorine-containing resins, fluorine-containing elastomers and the like, and fluorine-containing elastomers are preferable because they are most suitable for the treatment of the present invention.

The fluorine-containing elastomer is not limited particularly, and examples thereof are, for instance, fluorine-containing elastomers comprising a non-perfluoro fluorine-containing rubber (a) and a perfluoro fluorine-containing rubber (b).

Examples of the non-perfluoro fluorine-containing rubber (a) are fluorine-containing vinylidene fluoride (VdF) rubbers, fluorine-containing tetrafluoroethylene (TFE)/propylene rubbers, fluorine-containing ethylene/hexafluoropropylene (HFP) rubbers, fluorine-containing fluorosilicone rubbers, fluorine-containing fluorophosphazene rubbers, and the like. These can be used alone or can be used in optional combination thereof to an extent not to impair the effects of the present invention.

Fluorine-containing vinylidene fluoride rubbers are fluorine-containing elastomeric copolymers comprising 45 to 85% by mole of vinylidene fluoride and 55 to 15% by mole of at least one kind of other monomer copolymerizable with the vinylidene fluoride, preferably fluorine-containing elastomeric copolymers comprising 50 to 80% by mole of vinylidene fluoride and 50 to 20% by mole of at least one kind of other monomer copolymerizable with the vinylidene fluoride.

Examples of at least one kind of other monomer copolymerizable with the vinylidene fluoride are, for instance, fluorine-containing monomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE) and vinyl fluoride, and non-fluorine-containing monomers such as ethylene, propylene and alkyl vinyl ether. These can be used alone or can be used in optional combination thereof. Of these monomers, tetrafluoroethylene, hexafluoropropylene and perfluoro(alkyl vinyl ether) are preferable.

Examples of the rubber are VdF-HFP rubbers, VdF-HFP-TFE rubbers, VdF-CTFE rubbers, VdF-CTFE-TFE rubbers, VdF-TFE-PAVE rubbers, and the like.

Fluorine-containing tetrafluoroethylene/propylene rubbers are fluorine-containing copolymers comprising 45 to 70% by mole of tetrafluoroethylene, 55 to 30% by mole of propylene and further 0 to 5% by mole of a monomer giving a cure site based on the sum of tetrafluoroethylene and propylene.

Examples of the monomer giving a cure site are, for instance, cyano group-containing monomers, carboxyl group-containing monomers, alkoxycarbonyl group-containing monomers and the like disclosed in JP4-505345A and JP5-500070A. Also there may be employed a method of introducing iodine atom to an end of a polymer by using a compound having iodine atom as disclosed in JP53-125491A and JP62-12734A. In addition, it is possible to use an iodine compound and a small amount of bisolefin ($H_2C=CH(CF_2)_n CH=CH_2$, where n is 2 to 6) in combination.

Examples of the perfluoro fluorine-containing rubber (b) are those comprising tetrafluoroethylene, perfluoro(alkyl vinyl ether) and a monomer giving a cure site. The ratio of tetrafluoroethylene/perfluoro(alkyl vinyl ether) is preferably 50 to 90/10 to 50% by mole, more preferably 50 to 80/20 to 50% by mole, further preferably 55 to 70/30 to 45% by mole. A content of the monomer giving a cure site is preferably 0 to 5% by mole, more preferably 0 to 2% by mole based on the sum of tetrafluoroethylene and perfluoro(alkyl vinyl ether).

In this case, examples of perfluoro(alkyl vinyl ether) are, for instance, perfluoro(methyl vinyl ether), perfluoro(propyl vinyl ether) and the like. These can be used alone or can be used in optional combination thereof.

Examples of the monomer giving a cure site are, for instance, monomers represented by the general formula (1):

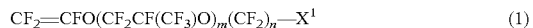

$CF_2$=$CFO(CF_2CF(CF_3)O)_m(CF_2)_n$—$X^1$ (1)

wherein m is 0 or an integer of 1 to 5, n is an integer of 1 to 3, $X^1$ is a cyano group, a carboxyl group or an alkoxycarbonyl group, and these can be used alone or can be used in optional combination thereof.

Also an emulsified product comprising a thermoplastic fluorine-containing rubber comprising an elastomeric fluorine-containing polymer chain segment and a non-elastomeric fluorine-containing polymer chain segment can be used.

The aqueous dispersion of a fluorine-containing elastomer used in the present invention can be prepared by a usual emulsion polymerization method. Polymerization conditions such as a polymerization temperature and time may be optionally decided depending on kind of monomer and an intended elastomer.

In the emulsion polymerization, an oil soluble radical polymerization initiator or a water soluble radical polymerization initiator can be used as a polymerization initiator.

Usually known oil soluble peroxides are used as an oil soluble radical polymerization initiator, and represented examples thereof are dialkyl peroxycarbonates such as di-isopropyl peroxydicarbonate and di-sec-butyl peroxydicarbonate; peroxy esters such as t-butyl peroxyisobutyrate and t-butyl peroxypivalate; dialkyl peroxides such as di-t-butyl peroxide; di[perfluoro (or fluorochloro)acyl]peroxides such as di(ω-hydro-dodecafluoroheptanoyl)peroxide, di(ω-hydro-tetradecafluorooctanoyl)peroxide, di(ω-hydro-hexadecafluorononanoyl) peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl) peroxide, di(pentachlorotetradecafluorodecanoyl) peroxide and di(undecachlorodotriacontafluorodocosanoyl) peroxide; and the like.

However peroxycarbonates such as di-isopropyl peroxycarbonate (IPP) and di-n-propyl peroxycarbonate (NPP) which are represented oil soluble initiators have a risk of explosion, is expensive and has a problem that during a polymerization reaction, adhesion of scales on side walls of a polymerization reactor easily occurs. Therefore it is preferable to use a water soluble polymerization initiator.

Usually known water soluble peroxides are used as a water soluble radical polymerization initiator. Examples thereof are, for instance, ammonium salts, potassium salts and sodium salts of persulfuric acid, perboric acid, perchloric acid, perphosphoric acid, and percarbonic acid, and t-butyl permaleate, t-butyl hydroperoxide and the like.

An amount of the water soluble radical polymerization initiator is not limited particularly, and at least an amount which does not decrease the polymerization rate significantly (for example, several ppm based on water) may be added all at once at the beginning of polymerization, or intermittently or continuously during the polymerization. An upper limit of the adding amount is within a range where polymerization reaction heat can be removed from the surface of the equipment. Among the above-mentioned initiators, ammonium salt initiators are preferable for semiconductor application for the purpose of using no metal.

There can be used, as an emulsifying agent, nonionic surfactants, anionic surfactants and cationic surfactants, and particularly preferable examples are fluorine-containing anionic surfactants such as perfluoroalkylcarboxylic acid salts such as ammonium perfluorooctanoate and ammonium perfluorohexanoate, ammonium salt of $CF_3(CF_2)_5CH_2CH_2SO_3$— and ammonium salt of sulfone amide having a structure of ($CF_3(CF_2)_3SO_2)_2N$—, and reactive emulsifying agents such as salts (preferably ammonium salts) of 2,3,3,3-tetrafluoro-2-[1,1,2,3,3,3-hexafluoro-2-[(1,1,2-trifluoro-2-propenyl)oxy]propoxy]propionic acid ($CH_2$=$CFCF_2OCF(CF_3)CF_2OCF(CF_3)COOH$). An amount of the emulsifying agent (based on water as a polymerization medium) is preferably 50 to 5,000 ppm.

In addition, a molecular weight regulator, a pH regulator and the like may be added. The molecular weight regulator may be added all at once at an initial stage of the polymerization or may be added continuously or intermittently.

Examples of the molecular weight regulator are, for instance, esters such as dimethyl malonate, diethyl malonate, methyl acetate, ethyl acetate, butyl acetate and dimethyl succinate, and in addition, isopentane, isopropanol, acetone, various mercaptans, carbon tetrachloride, cyclohexane, monoiodo methane, 1-iodoethane, 1-iodo-n-propane, isopropyl iodide, diiodo methane, 1,2-diiodoethane, 1,3-diiodo-n-propane, monoiodoperfluoromethane, monoiodoperfluoroethane, monoiodoperfluoropropane, monoiodoperfluorobutane (for example, 2-iodoperfluorobutane, 1-iodoperfluoro (1,1-dimethylethane)), monoiodoperfluoropentane (for example, 1-iodoperfluoro(4-methylbutane)), 1-iodoperfluoro-n-octane, monoiodoperfluorocyclobutane, 2-iodoperluoro(1-cyclobutylethane)cyclohexane, monoiodoperfluorocyclohexane, monoiododtrifluorocyclobutane, monoiododifluoromethane, monoiodomonofluoromethane, 2-iodo-1-hydroperfluoroethane, 3-iodo-1-hydroperfluoropropane, monoiodomonochlorodifluoromethane, monoiododichloromonofluoromethane, 2-iodo-1,2-dichloro-1,1,2-trifluoroethane, 4-iodo-1,2-dichloroperfluorobutane, 6-iodo-1,2-dichloroperfluorohexane, 4-iodo-1,2,4-trichloroperfluorobutane, 1-iodo-2,2-dihydroperfluoropropane, 1-iodo-2-hydroperfluoropropane, monoiodotrifluoroethylene, 3-iodoperfluoropropene-1,4-iodoperfluoropentene-1,4-iodo-5-chloroperfluoropentene-1,2-iodoperfluoro(1-cyclobutenylethane), 1,3-diiodoperfluoropropane, 1,4-diiodoperfluoro-n-butane, 1,3-diiodo-2-chloroperfluoropropane, 1,5-diiodo-2,4-dichloroperfluoro-n-pentane, 1,7-diiodoperfluoro-n-octane, 1,2-di (iododifluoromethyl)perfluorocyclobutane, 2-iodo-1,1,1-trifluoroethane, 1-iodo-1-hydroperfluoro(2-methylethane), 2-iodo-2,2-dichloro-1,1,1-trifluoroethane, 2-iodo-2-chloro-1,1,1-trifluoroethane and the like.

In addition, a buffering agent or the like may be added optionally in an amount not impairing the effect of the present invention.

The fluorine-containing resin is not limited particularly, and a fluorine-containing resin comprising at least one kind of fluorine-containing ethylenic polymer (a) is preferable. The fluorine-containing ethylenic polymer (a) is one having a structural unit derived from at least one kind of fluorine-containing ethylenic monomer. Examples of the above-mentioned fluorine-containing ethylenic monomer are, for instance, perfluoroolefins such as tetrafluoroethylene and perfluoro ethylenically unsaturated compounds represented by the general formula (2):

$$CF_2=CF-R_f^1 \quad (2)$$

wherein $R_f^1$ represents $-CF_3$ or $-OR_f^2$, where $R_f^2$ represents a perfluoroalkyl group having 1 to 5 carbon atoms, and fluoroolefins such as chlorotrifluoroethylene, trifluoroethylene, hexafluoroisobutene, vinylidene fluoride, vinyl fluoride and a compound represented by the general formula (3):

$$CH_2=CX^2(CF_2)_nX^3 \quad (3)$$

wherein $X^2$ is hydrogen atom or fluorine atom; $X^3$ is hydrogen atom, fluorine atom or chlorine atom; n is an integer of 1 to 10.

The fluorine-containing ethylenic polymer (a) may have a structural unit derived from a monomer copolymerizable with the above-mentioned fluorine-containing ethylenic monomer, and examples of such a monomer are non-fluorine-containing ethylenic monomers other than the above-mentioned fluoroolefins and perfluoroolefins. Examples of the non-fluorine-containing ethylenic monomer are, for instance, ethylene, propylene and alkyl vinyl ethers. The alkyl vinyl ethers are those having an alkyl group having 1 to 5 carbon atoms.

From the viewpoint of excellent heat resistance, chemical resistance and oil resistance of the obtained thermoplastic polymer composition and easy mold-processing, it is preferable that the fluorine-containing ethylenic polymer (a) is any one of:

(a-1) ethylene-tetrafluoroethylene copolymer (ETFE) comprising tetrafluoroethylene and ethylene, (a-2) tetrafluoroethylene-perfluoro(alkyl vinyl ether) copolymer (PFA) comprising tetrafluoroethylene and a perfluoro ethylenically unsaturated compound represented by the general formula (2):

$$CF_2=CF-R_f^1 \quad (2)$$

wherein $R_f^1$ represents $-CF_3$ or $-OR_f^2$, where $R_f^2$ represents a perfluoroalkyl group having 1 to 5 carbon atoms or tetrafluoroethylene-hexafluoropropylene copolymer (FEP), (a-3) ethylene-tetrafluoroethylene-hexafluoropropylene copolymer (Et-TFE-HFP copolymer) comprising tetrafluoroethylene, ethylene and a perfluoro ethylenically unsaturated compound represented by the general formula (2):

$$CF_2=CF-R_f^1 \quad (2)$$

wherein $R_f^1$ represents $-CF_3$ or $-OR_f^2$, where $R_f^2$ represents a perfluoroalkyl group having 1 to 5 carbon atoms, and (a-4) polyvinylidene fluoride (PVDF).

Then preferable fluorine-containing ethylenic polymers of (a-1) to (a-4) are explained below.

(a-1) ETFE

ETFE is preferable from the viewpoint of excellent heat resistance, chemical resistance, oil resistance and flexibility and easy mold-processing. A molar ratio of the tetrafluoroethylene unit to the ethylene unit is preferably 20:80 to 90:10, more preferably 62:38 to 90:10, especially preferably 63:37 to 80:20. In addition, the polymer may contain a third component. Kind of the third component is not limited particularly as far as it is copolymerizable with tetrafluoroethylene and ethylene. Usually monomers represented by the following formulae:

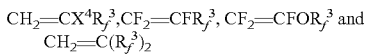

wherein $X^4$ is hydrogen atom or fluorine atom; $R_f^3$ is a fluoroalkyl group, are used as the third component. Of these monomers, fluorine-containing vinyl monomers represented by $CH_2=CX^4R_f^3$ are more preferable, and monomers having $R_f^3$ having 1 to 8 carbon atoms are especially preferable.

Examples of the fluorine-containing vinyl monomers represented by the above-mentioned formula are 1,1-dihydroperfluoropropene-1,1,1-dihydroperfluorobutene-1, 1,1,5-trihydroperfluoropentene-1,1,1,7-trihydroperfluoroheptene-1, 1,1,2-trihydroperfluorohexene-1,1,1,2-trihydroperfluorooctene-1,2,2,3,3,4,4,5,5-octafluoropentylvinylether, perfluoro(methyl vinyl ether), perfluoro(propyl vinyl ether), hexafluoropropene, perfluorobutene-1,3,3,3-trifluoro-2-trifluoromethylpropene-1 and 2,3,3,3,4,4,5,5-heptafluoro-1-pentene ($CH_2=CFCF_2CF_2CF_2H$).

The content of the third component is preferably 0.1 to 10% by mole, more preferably 0.1 to 5% by mole, especially preferably 0.2 to 4% by mole based on the fluorine-containing ethylenic polymer (a).

(a-2) PFA or FEP

PFA or FEP is preferable since heat resistance is particularly excellent, further chemical resistance and oil resistance are excellent and mold-processing is easy. More preferable is the fluorine-containing ethylenic polymer (a) comprising 90 to 99% by mole of a tetrafluoroethylene unit and 1 to 10% by mole of a unit of perfluoro ethylenically unsaturated compound represented by the above-mentioned general formula (2). In addition, the fluorine-containing ethylenic polymer (a) comprising tetrafluoroethylene and the perfluoro ethylenically unsaturated compound represented by the general formula (2) may contain a third component. Kind of the third component is not limited particularly as far as it is copolymerizable with tetrafluoroethylene and the perfluoro ethylenically unsaturated compound represented by the formula (2).

(a-3) Et-TFE-HFP Copolymer

An Et-TFE-HFP copolymer is preferable from the viewpoint of flexibility in addition to the above-mentioned functions and effects. More preferable is the fluorine-containing ethylenic polymer (a) comprising 19 to 90% by mole of a tetrafluoroethylene unit, 9 to 80% by mole of an ethylene unit and 1 to 72% by mole of a unit of the perfluoro ethylenically unsaturated compound represented by the general formula (2), and further preferable is the fluorine-containing ethylenic polymer (a) comprising 20 to 70% by mole of a tetrafluoroethylene unit, 20 to 60% by mole of an ethylene unit and 1 to 60% by mole of a unit of the perfluoro ethylenically unsaturated compound represented by the general formula (2).

Also the fluorine-containing ethylenic polymer (a) comprising tetrafluoroethylene, ethylene and the perfluoro ethylenically unsaturated compound represented by the general formula (2) may contain an additional component. Examples of the additional component are 2,3,3,3,4,4,5,5-heptafluoro-1-pentene ($CH_2=CFCF_2CF_2CF_2H$) and the like.

The content of the additional component is preferably 0.1 to 3% by mole based on the fluorine-containing ethylenic polymer (a).

(a-4) PVDF

PVDF is preferable from the viewpoint of flexibility and excellent mechanical properties in addition to the above-mentioned functions and effects.

In addition, a melting point of the fluorine-containing ethylenic polymer (a) is 120° to 330° C., preferably 150° to 310° C., more preferably 150° to 290° C., further preferably 170° to 250° C.

A primary particle size of the fluorine-containing polymer particles in the aqueous dispersion of fluorine-containing polymer is preferably 80 to 350 nm, more preferably 90 to 300 nm in an average particle size. When the primary particle size is less than 80 nm, much amount of an emulsifying agent is necessary in aqueous emulsion polymerization or yield of the polymer tends to decrease. When the primary particle size is more than 350 nm, stability of the aqueous emulsion tends to be lost.

A Mooney viscosity ($ML_{1+10}$ at 100° C.) of the fluorine-containing polymer obtained by the above-mentioned preparation process is preferably not more than 40, more preferably not more than 30, further preferably not more than 20. A lower limit of the Mooney viscosity is not limited particularly, and is preferably not less than 1, more preferably not less than 2. When the Mooney viscosity is less than 1, there is no problem in a drying step, but in a polymerization step, adhesion of the polymer inside a reactor tends to increase and mixing of a filler tends to be difficult. When the Mooney viscosity is more than 40, equipment having a high torque is necessary, and therefore equipment cost tends to be high.

A number average molecular weight (Mn) of the fluorine-containing polymer is preferably 1,000 to 150,000, more preferably 5,000 to 100,000, further preferably 10,000 to 70,000. When the number average molecular weight (Mn) is less than 1,000, aqueous emulsion polymerization tends to be difficult due to adhesion of the fluorine-containing polymer inside a reactor and mixing of a filler tends to be difficult. When the number average molecular weight (Mn) is more than 150,000, equipment having a high torque is necessary, and therefore equipment cost tends to be high.

An upper limit and a lower limit of a molecular weight distribution (weight average molecular weight Mw/number average molecular weight Mn) of the fluorine-containing polymer are not limited particularly, and the molecular weight distribution is preferably not more than 8.0. If the molecular weight distribution exceeds 8.0, there is a tendency that a viscosity of a high molecular weight component increases and heat treatment becomes difficult.

Heat treating means is not limited particularly, and is preferably one comprising means for mechanically stirring the aqueous dispersion of fluorine-containing polymer to apply a shearing force thereto, heating means, evacuation/pressure reduction means, deairing means, means for heating and melting the obtained fluorine-containing polymer and means for pressurizing to discharge the molten fluorine-containing polymer. Specific examples of equipment provided with such means are usual autoclaves, LÖDIGE Mixer (available from MATSUBO CORPORATION), SC processor (available from KURIMOTO, LTD.), film evaporator for high viscosity (available from Kobelco Eco Solutions Co., Ltd.), Ploughshare Mixer (available from Pacific Machinery & Engineering Co., Ltd.), Planetary Mixer (available from Inoue Mfg., Inc.), two-screw extruder (available from The Japan Steel Works, Ltd.) and the like.

LÖDIGE Mixer is equipment which is provided with a specific plough-shaped shovel in its horizontal drum and causes centrifugal diffusion and vortex action by its shape, mounting angle and rotation speed, thereby enabling three-dimensional fluidization to be given to the mixture.

SC processor is equipment provided with two hollow shafts having paddles rotating in different directions, and has a large heating surface area by circulating heating medium inside the shafts. Further the equipment is provided with an evaporation chamber on the top of the equipment body and has a large evaporation capability.

A film evaporator for high viscosity is provided with a vapor outlet, distributor, stirring blade and screw, and has a large heating surface area by circulating heating medium outside the vessel. Since the evaporator is provided with a stirring blade having a special shape, it is possible to make the dispersion into a thin film and at the same time, forcedly transfer the thin film onto a lower part of equipment.

Ploughshare Mixer is equipment having two functions, i.e. one is a function of suspension, diffusion and mixing by shovel blades having a unique shape and another one is a function of high speed shearing and dispersion by multistage chopper blades.

Planetary Mixer is equipment having two framed blades undergoing rotation and revolution (planetary motion), thereby giving a strong shearing force between the blades and on the blades and the inner surface of the tank and thus has kneading effects for medium-viscosity and high-viscosity.

A two-screw extruder is equipment being capable of extruding a fluid while two powerful shafts are rotating in the same direction or different directions.

Any of equipment mentioned above have a large heating surface area and can heat the dispersion uniformly.

The heat treating conditions are so set as to obtain a water content of not more than 1% by weight, and are optionally decided depending on a concentration of the aqueous dispersion of a fluorine-containing polymer. The heat treating temperature is preferably 50° to 300° C., more preferably 70° to 200° C., and the heat treating time is preferably 1 to 180 minutes, more preferably 15 to 120 minutes. In the case of thermally stable fluorine-containing elastomers, there is no problem even if they are heat-treated for a period of time exceeding 180 minutes. However, from economical point of view, usually the heat treating time is preferably not more than 900 minutes, more preferably not more than 600 minutes.

The heat treatment may be carried out under pressure, under normal pressure or under reduced pressure, and normal pressure or reduced pressure is preferable. A degree of pressure reduction is preferably not less than 500 Torr in order to prevent a product temperature from decreasing when a water content is high. In the case where the water content becomes not more than 5%, it is preferable to heat-treat under the pressure of 1 to 500 Torr because the water content of the product is decreased.

Also when heat-treating, it is preferable to carry out stirring. The rotation speed for stirring is not limited particularly and is preferably 1 to 1,000 rpm, more preferably 3 to 300 rpm. When the rotation speed is less than 5 rpm, the heat-treating time tends to be longer, and when the rotation speed exceeds 1,000 rpm, special specifications of equipment tend to be required.

The water content of fluorine-containing polymer obtained by the above-mentioned preparation process is not more than 1% by weight, preferably not more than 0.5% by weight, more preferably not more than 0.3% by weight. If the water content exceeds 1% by weight, there is a tendency that crosslinking reaction is hindered and foaming of a molded article is caused.

In the above-mentioned heat treatment, when equipment having a large deairing force is used, an emulsifying agent (remaining emulsifying agent) remaining when the polymerization has been completed can be removed together with water, and as a result of sufficient heat treatment, an amount of the remaining emulsifying agent contained in the obtained fluorine-containing polymer can be decreased. The amount of the remaining emulsifying agent contained in the fluorine-containing polymer obtained by the above-mentioned preparation process is preferably not more than 1,000 ppm, more preferably not more than 100 ppm. If much amount of emulsifying agent remains, it is not preferable because a curing speed tends to be decreased particularly in the case of a polyol crosslinking system.

Further in the fluorine-containing polymer obtained by the above-mentioned preparation process, its metal content is not more than 50 ppm, more preferably not more than 10 ppm, further preferably not more than 1 ppm because the fluorine-containing polymer is separated from the aqueous dispersion of a fluorine-containing polymer without using a coagulating agent or by using a very small amount of coagulating agent. Since the metal content is not more than 50 ppm, the fluorine-containing polymer can be used suitably in the fields of semiconductor manufacturing equipment and the like where cleanness is required.

When a coagulating agent is used in the present invention, its amount is preferably less than 3 parts by weight, more preferably not more than 0.1 part by weight based on 100 parts by weight of the fluorine-containing polymer. When the amount of a coagulating agent is more than 3 parts by weight, even if a washing step is carried out, it is difficult to control the metal content of the fluorine-containing polymer 50 ppm or lower.

The fluorine-containing polymer obtained by the above-mentioned preparation process is successively heated and melted in the same treating means and then is pressurized, thereby enabling the molten fluorine-containing polymer to be extruded.

The heating temperature at melting is a temperature sufficing for melting of the fluorine-containing polymer. The heating temperature varies depending on kind of a fluorine-containing polymer and is preferably 50° to 200° C.

A melt-extrusion pressure is preferably from normal pressure to 10 MPa, more preferably from normal pressure to 0.5 MPa.

It is preferable that the fluorine-containing polymer obtained by the preparation process of the present invention is a resin in the form of powder after the drying, or a resin or an elastomer, a viscosity of which is decreased to 100,000 poises or less, more preferably 30,000 poises or less by heat-treatment at a temperature of not more than 300° C., from the viewpoint of characteristics of equipment exemplified in the present invention.

Also the curable composition of the present invention comprises the aforementioned fluorine-containing polymer and a crosslinking agent.

The crosslinking agent usable in the present invention may be optionally selected depending on a crosslinking system to be employed. As a crosslinking system, any of polyamine crosslinking system, polyol crosslinking system and peroxide crosslinking system can be employed, and particularly in the case of crosslinking by peroxide crosslinking system, an effect of the present invention can be exhibited remarkably. In addition, radiation crosslinking can also be employed.

Non-limiting examples of a crosslinking agent are polyhydroxy compounds such as bisphenol AF, hydroquinone, bisphenol A and diaminobisphenol AF for a polyol crosslinking system; organic peroxides such as α,α'-bis(t-butylperoxy)diisopropylbenzene, 2,5-dimethyl-2,5-di(t-butylperoxy)hexane and dicumyl peroxide for a peroxide crosslinking system; and polyamine compounds such as hexamethylenediamine carbamate and N,N'-dicinnamylidene-1,6-hexamethylenediamine for a polyamine crosslinking system.

An amount of the crosslinking agent is preferably 0.01 to 10 parts by weight, more preferably 0.1 to 5 parts by weight based on 100 parts by weight of the fluorine-containing polymer. When the amount of the crosslinking agent is less than 0.01 part by weight, a degree of crosslinking is insufficient, and therefore performances of a fluorine-containing molded article tends to be impaired. When the amount of the crosslinking agent exceeds 10 parts by weight, it is not preferable from economical point of view and in addition, a crosslinking time tends to be longer since a crosslinking density becomes too high.

Examples of a crosslinking accelerator usable for a polyol crosslinking system are organic bases usually used for crosslinking of elastomers such as various quaternary ammonium salts, quaternary phosphonium salts, cyclic amines and mono-functional amine compounds. Examples thereof are, for instance, quaternary ammonium salts such as tetrabutylammonium bromide, tetrabutylammonium chloride, benzyltributylammonium chloride, benzyltriethylammonium chloride, tetrabutylammoniumhydrogen sulfate and tetrabutylammonium hydroxide; quaternary phosphonium salts such as benzyltriphenylphosphonium chloride, tributylallylphosphonium chloride, tributyl-2-methoxypropylphosphonium chloride and benzylphenyl(dimethylamino)phosphonium chloride; mono-functional amines such as benzyl methyl amine and benzyl ethanol amine; and cyclic amines such as 1,8-diazabicyclo-[5.4.0]-undec-7-ene.

Examples of a crosslinking accelerator for a peroxide crosslinking system are triallyl cyanurate, triallyl isocyanurate (TAIC), tris(diallylamine-s-triazine), triallyl phosphite, N,N-diallylacrylamide, hexaallylphosphoramide, N,N,N',N'-tetraallyltetraphthalamide, N,N,N',N'-tetraallylmalonamide, trivinyl isocyanurate, 2,4,6-trivinylmethyltrisiloxane, tri(5-norbornene-2-methylene)cyanurate and the like. Among these, triallyl isocyanurate (TAIC) is preferable from the viewpoint of crosslinkability and physical properties of a crosslinked article.

An amount of the crosslinking accelerator is preferably 0.01 to 10 parts by weight, more preferably 0.1 to 5.0 parts by weight based on 100 parts by weight of the fluorine-containing polymer. When the amount of the crosslinking accelerator is less than 0.01 part by weight, a crosslinking time tends to be so long to an extent not to be practicable. When the amount of the crosslinking accelerator is more than 10 parts by weight, there is a tendency that a crosslinking proceeds too fast and in addition, compression set of a molded article is lowered.

Further a filler which is used as a usual additive may be used to an extent not to impair the purpose of the present invention. Examples of the filler are inorganic fillers such as carbon black, silica and silicate, metallic oxides such as magnesium oxide and metallic hydroxides such as calcium hydroxide. For applications requiring cleanness, it is preferable to use fluoro polymers, basically PTFE, and ETFE and PVdF, heat resistant resins such as polyimide, graphitized carbon black and high purity synthetic quartz silica.

A preparation process and a crosslinking method of the curable composition are not limited particularly, and for example, known methods such as compression molding, extrusion molding, transfer molding and injection molding can be employed. The curable composition is also suitable for integrated molding with other materials such as a resin and a metal and for a field molding method such as mold-in-place method, and can be suitably used particularly for integrated molding with a resin having a problem with strength as a counterpart.

The fluorine-containing elastomer composition can be molded alone or can be molded in the form of a blend with other kind of polymer or a composition comprising such a polymer.

The molded article of the present invention can be used suitably in the fields of semiconductors such as semiconductor manufacturing equipment, liquid crystal panel manufacturing equipment, plasma panel manufacturing equipment, plasma address liquid crystal panel, field emission display panel and substrates of solar cells; automobiles; airplane; rocket; ship; chemical plants; chemicals such as pharmaceuticals; photography such as developing machine; printing such as printing machine; coating such as coating facilities; analytical, physical and chemical appliances; food plant equipment; power plant equipment; steel making such as steel sheet processing facilities; general industry; electricity; fuel cell; electronic parts; and field molding.

Among them, in the field of automobiles, a gasket, shaft seal, valve stem seal, sealing material and hose can be used for engine and its peripheral devices; a hose and sealing material can be used for automatic transmission; and an O-(square)-ring, tube, packing, valve core material, hose, sealing material and diaphragm can be used for a fuel system and its peripheral devices. Specifically the molded article can be used as an engine head gasket, metal gasket, oil pan gasket, crank shaft seal, cam shaft seal, valve stem seal, manifold packing, oil hose, oxygen sensor seal, ATF hose, injector O-ring, injector packing, fuel pump O-ring, diaphragm, fuel hose, crank shaft seal, gear box seal, power piston packing, cylinder liner seal, valve stem seal, front pump seal of automatic transmission, rear axle pinion seal, universal joint gasket, speed meter pinion seal, foot brake piston cup, torque transmission O-ring, oil seal, exhaust gas reactor seal, bearing seal, EGR tube, twin carburetor tube, diaphragm of carburetor sensor, vibration-proof rubber (engine mount, exhaust part, etc.), hose for exhaust gas reactor, oxygen sensor bush, etc. In the fields of semiconductors such as semiconductor manufacturing equipment, liquid crystal panel manufacturing equipment, plasma panel manufacturing equipment, plasma address liquid crystal panel, field emission display panel and substrates of solar cells, there are O-(square)-ring, packing, sealing material, tube, roll, coating, lining, gasket, diaphragm, hose, etc., and these can be used for CVD equipment, dry etching equipment, wet etching equipment, oxidation/diffusion equipment, sputtering equipment, ashing equipment, washing equipment, ion implantation equipment, exhausting equipment, pipes for chemicals and gas pipes. Specifically they can be used for O-ring and sealing material of a gate valve, O-ring and sealing material of quartz window, O-ring and sealing material of a chamber, O-ring and sealing material of a gate, O-ring and sealing material of a bell jar, O-ring and sealing material of a coupling, O-ring, sealing material and diaphragm of a pump, O-ring and sealing material of gas control equipment for semiconductors, O-ring and sealing material for a resist developing solution and releasing solution, hose and tube for a wafer washing solution, roll for wafer transfer, lining and coating for a resist developing solution tank and a releasing solution tank, lining and coating for a wafer washing solution tank, and lining and coating for a wet etching tank. Further there are used as a sealing material, sealing agent, covering material of optical fiber quartz, electronic parts intended for insulation, vibration proof, water proof and moisture proof, potting and coating of circuit board, adhesive sealing, gasket for magnetic storage, modifying material of a sealing material such as epoxy, sealant for clean room and clean facilities, etc.

Also the curable composition of the present invention is suitably used, by making use of its cleanness, particularly for a gasket of magnetic recording device (hard disk drive), and a sealing material for cleaning facilities such as a sealing material for semiconductor manufacturing equipment and storage of devices such as wafer.

Further the curable composition of the present invention is suitably used particularly for sealing materials for fuel cells such as packings used between the fuel cell electrodes or on peripheral pipes thereof by making use of its characteristics such as chemical resistance, less permeation of gas and flame retardance.

EXAMPLES

The present invention is then explained by means of Examples, but the present invention is not limited thereto.

<Measurement of Water Content>

A weight reduction ratio is used as a simple method of measuring a water content of a fluorine-containing polymer which does not substantially contain an evaporative component other than water. In a 200° C. oven, 10 g of a sample is dried for two hours, and a weight of the sample is measured with a precision balance before and after the drying treatment. The water content is assumed to be a value (%) obtained by dividing a weight reduction amount by a weight before the heat treatment.

<Measurement of Amount of Remaining Emulsifying Agent>

An amount of remaining emulsifying agent is measured with a high speed liquid chromatography mass spectrometer (model 2695 available from Waters, detector: Quattro Micro API, column: Atlantis dC18, solvent: a mixture of 55% of acetonitrile and 45% of 0.6% aqueous solution of acetic acid).

<Mooney Viscosity>

A Mooney viscosity is measured according to ASTM-D 1646 and JIS K6300.

Measuring device: Model MV2000E available from ALPHA Technologies
Number of revolutions of rotor: 2 rpm
Measuring temperature: 100° C.

<Metal Content>

A sample is put in a platinum evaporating dish, subjected to ashing at 500° C. for 30 minutes, and then dissolved in high purity hydrochloric acid (35%). Then a metal content is measured with a flame-less atomic absorption spectrophotometer.

Measuring device: Polarized Zeeman atomic absorption spectrophotometer Z-8100 (available from Hitachi, Ltd.)

The polymer (elastomer) is subjected to vulcanization by the following standard formulation under the following standard vulcanization conditions.

(Standard Formulation 1)
Fluorine-containing elastomer: 100 parts by weight Triallyl isocyanurate (TAIC): 4 parts by weight
Perhexa 25B: 1.5 parts by weight
Carbon black MT-C: 20 parts by weight (Standard Formulation 2)
Fluorine-containing polymer: 100 parts by weight
Bisphenol AF: 2.17 parts by weight
Benzyltriphenylphosphonium chloride: 0.43 part by weight
Highly active magnesium oxide: 3 parts by weight
Carbon black MT-C: 20 parts by weight
Calcium hydroxide: 6 parts by weight (Standard Vulcanization Condition 1)
  Kneading method: Kneading by roll
  Press vulcanization: at 160° C. for 10 minutes
  Vulcanization in an oven: at 180° C. for 4 hours
(Standard Vulcanization Condition 2)
  Kneading method: Kneading by roll
  Press vulcanization: at 170° C. for 10 minutes
  Vulcanization in an oven: at 230° C. for 24 hours
<Compression Set>
  Compression set of O-ring (AS-568A-214) under 25% compression is measured according to JIS-K6301.
<100% Modulus (M100)>
  The curable composition shown in Table 1 is subjected to primary press vulcanization and secondary oven vulcanization under the standard vulcanization conditions to give a 2 mm thick sheet, and the 100% modulus thereof is measured according to JIS-K6251.
<Tensile Strength at Break (Tb) and Tensile Elongation at Break (Eb)>
  The curable composition shown in Table 1 is subjected to primary press vulcanization and secondary oven vulcanization under the standard vulcanization conditions to give a 2 mm thick sheet, and measurement is carried out according to JIS-K6251.
<Vulcanization Properties>
  A vulcanization curve at 160° C. is obtained at the time of conducting primary press vulcanization by using JSR curastometer model V, and a minimum viscosity (ML), a vulcanization degree (MH), an induction time (T10) and an optimum vulcanization time (T90) are determined.
<Shore A Hardness>
  Measurement of hardness is carried out according to ASTM D2240. Specifically hardness is measured with an analogue hardness meter model A available from Kobunshi Keiki Kabushiki Kaisha.
<Measurement of Polymer Concentration>
  About 2 g of emulsion of polymer is measured and put in an evaporating dish and is subjected to heat treatment at 200° C. for two hours in an oven. The polymer concentration is obtained from the following equation.

Polymer concentration (% by weight)=[(Amount of remaining polymer after treatment)/(Amount of emulsion before treatment)]×100

Preparation Example 1

(Polymerization of Seed Polymer Particles)

Into a 1.8-liter polymerization reactor equipped with an electromagnetic induction stirrer were poured 720 g of pure water, 290 g of 10% by weight aqueous solution of ammonium perfluorooctanoate and 0.6 g of diethylmalonate, and the inside of the reactor was sufficiently replaced by nitrogen gas, and the inside pressure was decreased. These operations were repeated three times, and 20 g of VdF and 51 g of HFP were introduced under reduced pressure. Then the reactor was heated up to 80° C. with stirring. Subsequently a solution prepared by dissolving 0.02 g of ammonium persulfate (APS) in 0.6 g of pure water was introduced with pressurized nitrogen gas to initiate polymerization. A polymerization pressure was adjusted to 2 MPa and the polymerization was carried out with stirring while continuously supplying a monomer mixture of VdF/HFP (78/22% by mole) to make up for reduction of the inside pressure during the polymerization. Until completion of the polymerization, 215 g of monomers was supplied to the reactor.

The weight of the obtained emulsion was 1,233 g, the polymer concentration was 18.1% by weight, and the number of polymer particles was $1.2 \times 10^{16}$ per 1 g of water. Thirty minutes after, the stirring was stopped and the monomers were released to terminate the polymerization.

Preparation Example 2

(Preparation of Emulsion of Fluorine-Containing Elastomer)

Into a 50-liter polymerization reactor equipped with the same electromagnetic induction stirrer as in Preparation Example 1 were poured 32.8 kg of pure water, 650 g of the aqueous dispersion of polymer particles prepared in Preparation Example 1 and 150 g of 10% by weight aqueous solution of ammonium perfluorooctanoate, and the inside of the reactor was sufficiently replaced by nitrogen gas, and the inside pressure was decreased. These operations were repeated three times, and 4.0 kg of VdF and 16.3 kg of HFP were introduced under reduced pressure. Then the reactor was heated up to 80° C. with stirring. Subsequently 150 g of octafluoro-1,4-diiodobutane and a solution prepared by dissolving 1.68 g of APS in 50 g of pure water were introduced with pressurized nitrogen gas to initiate polymerization. The polymerization was continued under the conditions of (a) and (b), the stirring was stopped 2.8 hours after, and the monomers were released to terminate the polymerization.

(a) A monomer mixture of VdF/HFP (95/5% by mole) was continuously supplied, and a pressure in a gaseous phase was maintained at 6 MPa. Until completion of the polymerization, 7.4 kg of monomers was supplied to the reactor.

(b) The number of revolutions for stirring was maintained at 230 rpm.

The weight of the obtained emulsion was 47.6 kg, the polymer concentration was 30.5% by weight, and the number of polymer particles was $2.4 \times 10^{14}$ per 1 g of water. An amount of the fluorine-containing elastomer was 14.5 kg, a weight average molecular weight Mw measured by GPC was 85,000, a number average molecular weight Mn was 45,000, and Mw/Mn was 1.9. According to measurement with $^{19}$F-NMR, the polymer was one comprising VdF/HFP=78/22 (% by mole). A Mooney viscosity at 100° C. ($ML_{1+10}$ at 100° C.) of the obtained fluorine-containing polymer was 7.

Preparation Example 3

(Preparation of Emulsion of Fluorine-Containing Elastomer)

Into a 50-liter polymerization reactor equipped with the same electromagnetic induction stirrer as in Preparation Example 1 were poured 32.8 kg of pure water, 3.3 g of an aqueous solution of ammonium 2,3,3,3-tetrafluoro-2-[1,1,2,3,3,3-hexafluoro-2-[(1,1,2-trifluoro-2-propenyl)oxy]propoxy]propionate and 460 g of diethylmalonate, and the inside of the reactor was sufficiently replaced by nitrogen gas, and the inside pressure was decreased. These operations were repeated three times, and 4.0 kg of VdF and 16.3 kg of HFP were introduced under reduced pressure. Then the reactor was heated up to 80° C. with stirring. Subsequently 9.84 g of APS was introduced with pressurized nitrogen gas to initiate polymerization. The polymerization was continued under the conditions of (a) and (b), the stirring was stopped 2.5 hours after, and the monomers were released to terminate the polymerization.

(a) A monomer mixture of VdF/HFP (95/5% by mole) was continuously supplied, and a pressure in a gaseous phase was maintained at 6 MPa. Until completion of the polymerization, 7.4 kg of monomers was supplied to the reactor.

(b) The number of revolutions for stirring was maintained at 230 rpm.

The weight of the obtained emulsion was 47.6 kg, the polymer concentration was 30.3% by weight, and the number of polymer particles was $3.4 \times 10^{14}$ per 1 g of water. An amount of the fluorine-containing elastomer was 14.5 kg, a weight average molecular weight Mw measured by GPC was 110,000, a number average molecular weight Mn was 60,000, and Mw/Mn was 1.8. According to measurement with $^{19}$F-NMR, the polymer was one comprising VdF/HFP=78/22 (% by mole). A Mooney viscosity at 100° C. ($ML_{1+10}$ at 100° C.) of the obtained fluorine-containing polymer was 8.

Example 1

Into a vertical autoclave equipped with a vacuum pump and a condenser as auxiliary equipment was poured 200 kg of the emulsion obtained in Preparation Example 2, and a jacket temperature was increased to about 160° C. with stirring at 3 to 10 rpm. Evaporated steam was collected with the condenser under atmospheric pressure to a degree of vacuum of 100 Torr. About five hours after, 200 kg of the starting material was further added, and the same operations were repeated. When the inside temperature reached 150° C. or more, evacuation was canceled, and the fluorine-containing polymer was discharged from a bottom valve under a pressure of 0.05 MPa. The obtained amount was 100 kg (yield: 93%), and the Mooney viscosity at 100° C. of the obtained fluorine-containing polymer was 7. The viscosity at 130° C. of the obtained fluorine-containing polymer was 17,000 poises. The water content, emulsifying agent content and metal content of this polymer are shown in Table 1. Further a curable composition was prepared using the obtained fluorine-containing polymer under Standard Formulation 1, and vulcanization properties measured under Standard Vulcanization Condition 1 are shown in Table 2.

Example 2

Into a biaxial reactor (brand name: SC processor available from KURIMOTO, LTD.) equipped with a vacuum pump and a condenser as auxiliary equipment was poured 55 kg of the emulsion obtained in Preparation Example 2 at a charging rate of about 400 g per minute (a residence time in the reactor was about 15 minutes), and a jacket temperature was increased to about 160° C. under a degree of vacuum of 100 Torr. While evaporated steam was collected with the condenser, a fluorine-containing polymer was continuously obtained from a discharging part. The obtained amount was 16 kg (yield: 95%), and the Mooney viscosity at 100° C. of the obtained fluorine-containing polymer was 7. The viscosity at 130° C. of the obtained fluorine-containing polymer was 17,000 poises. The water content, emulsifying agent content and metal content of this polymer are shown in Table 1. Further a curable composition was prepared using the obtained fluorine-containing polymer under Standard Formulation 1, and vulcanization properties measured under Standard Vulcanization Condition 1 are shown in Table 2.

Example 3

Into a 130-liter horizontal mixer (brand name: LÖDIGE Mixer available from MATSUBO CORPORATION) equipped with a vacuum pump and a condenser as auxiliary equipment was poured 55 kg of the emulsion obtained in Preparation Example 2, and a jacket temperature was increased to about 160° C. Evaporated steam was collected with the condenser under a degree of vacuum of not more than 500 Torr. About one and a half hours after, in a state of the inside temperature being more than 150° C., the mixer was restored to atmospheric pressure, and the fluorine-containing polymer was discharged from a bottom valve. The obtained amount was 15.9 kg (yield: 95%), and the Mooney viscosity at 100° C. of the obtained fluorine-containing polymer was 7. The viscosity at 130° C. of the obtained fluorine-containing polymer was 17,000 poises. The water content, emulsifying agent content and metal content of this polymer are shown in Table 1. Further a curable composition was prepared using the obtained fluorine-containing polymer under Standard Formulation 1, and vulcanization properties measured under Standard Vulcanization Condition 1 are shown in Table 2.

Example 4

Under the same conditions as in Example 3, 55 kg of the emulsion obtained in Preparation Example 3 was subjected to heating and drying treatment. The obtained amount was 15.8 kg (yield: 95%), and the Mooney viscosity at 100° C. of the obtained fluorine-containing polymer was 8. The viscosity at 130° C. of the obtained fluorine-containing polymer was 18,000 poises. The water content of this polymer was 0.05 (% by weight), and no emulsifying agent content was detected. Further a curable composition was prepared using the obtained fluorine-containing polymer under Standard Formulation 2, and vulcanization properties measured under Standard Vulcanization Condition 2 are shown in Table 2.

TABLE 1

|  | Ex. 1 | Ex. 2 | Ex. 3 | Ex. 4 |
|---|---|---|---|---|
| Water content (% by weight) | 0.02 | 0.05 | 0.16 | 0.05 |
| Content of emulsifying agent (ppm) | 135 | 70 | 100 | — |
| Metal content (ppm) | | | | |
| Al | <1 | <1 | <1 | — |
| Fe | 1.0 | 1.2 | 1.1 | — |
| Cr | 0.1 | 0.1 | 0.1 | — |
| Ni | 0.1 | 0.1 | 0.1 | — |

TABLE 2

|  | Unit | Ex. 1 | Ex. 2 | Ex. 3 | Ex. 4 |
|---|---|---|---|---|---|
| Curastometer model V |  | 160° C. | 160° C. | 160° C. | 170° C. |
| Minimum torque (ML) | kgf | 0.05 | 0.03 | 0.05 | 0.08 |
| Maximum torque (MH) | kgf | 19.9 | 19.8 | 19.7 | 11.4 |
| Induction time (T10) | min | 1.6 | 1.6 | 1.6 | 4.6 |
| Optimum vulcanization time (T90) | min | 4.5 | 4.5 | 4.9 | 5.5 |

TABLE 2-continued

|  | Unit | Ex. 1 | Ex. 2 | Ex. 3 | Ex. 4 |
|---|---|---|---|---|---|
| Physical properties under normal condition | | | | | |
| 100% modulus (M100) | MPa | 2.8 | 2.9 | 2.9 | 2.9 |
| Tensile strength at break (Tb) | MPa | 19.5 | 19.3 | 20.9 | 8.5 |
| Tensile elongation at break (Eb) | % | 310 | 320 | 330 | 250 |
| Hardness Hs (shore A) peak value | pts | 70 | 70 | 71 | 75 |
| Compression set 200° C. × 72 hr | | | | | |
| when undergoing no secondary vulcanization | % | 21.9 | 20.9 | 21.7 | 43.9 |
| after secondary vulcanization | % | 19.2 | 18.1 | 19.6 | 23.7 |

INDUSTRIAL APPLICABILITY

According to the preparation process of the present invention, even a fluorine-containing polymer having a low viscosity can be efficiently separated by a simple heat-treating method, and thus a fluorine-containing polymer can be easily prepared.

The invention claimed is:

1. A process for preparing a fluorine-containing elastomer comprising a step for heat-treating an aqueous dispersion of a fluorine-containing elastomer having a concentration of 3 to 70% by weight without using a coagulation agent to obtain a fluorine-containing elastomer having a water content of not more than 1% by weight and a metal content of not more than 50 ppm, wherein the primary particle size of the fluorine-containing elastomer is 80 to 350 nm.

2. The preparation process of claim 1, wherein the concentration of the aqueous dispersion of a fluorine-containing elastomer is 10 to 50% by weight.

3. The preparation process of claim 2, wherein a Mooney viscosity, $ML_{1+10}$ at 100° C., of the fluorine-containing elastomer is not more than 40.

4. The preparation process of claim 1, wherein a Mooney viscosity, $ML_{1+10}$ at 100° C., of the fluorine-containing elastomer is not more than 40.

5. The preparation process of claim 1, wherein the aqueous dispersion of the fluorine-containing elastomer has a concentration of 15 to 35% by weight.

6. The preparation process of claim 1, wherein the fluorine-containing elastomer of the aqueous dispersion is obtained by emulsion-polymerization.

* * * * *